Feb. 16, 1926.
F. SMYTHE ET AL
1,573,332
EGG HANDLING MACHINE
Filed July 6, 1925
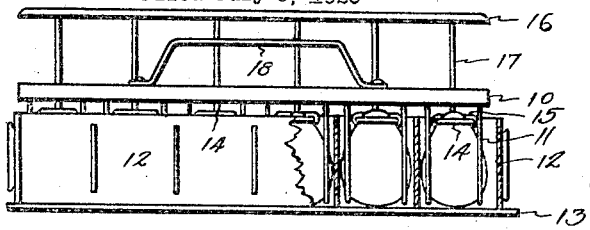
FIG.1
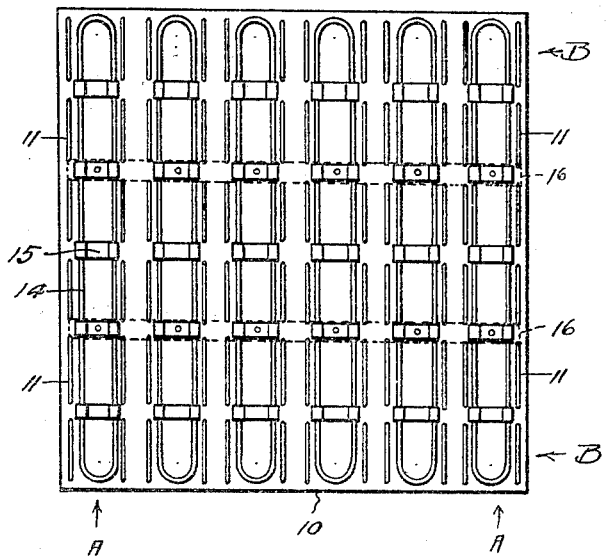
FIG.2
FIG.3
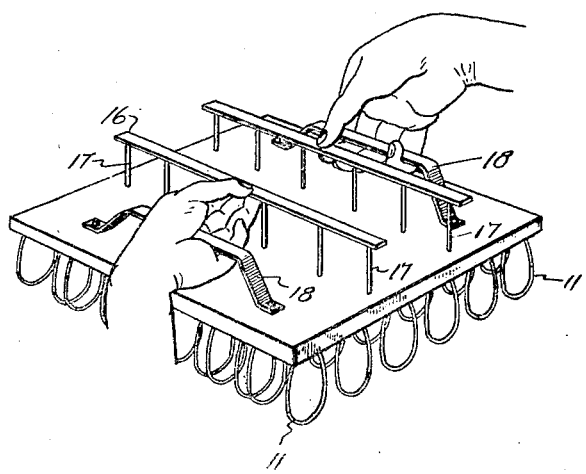
Inventors
Francis Smythe
Ross Smythe Patented Feb. 16, 1926.

1,573,332

UNITED STATES PATENT OFFICE.

FRANCIS SMYTHE AND ROSS SMYTHE, OF AKRON, IOWA.

EGG-HANDLING MACHINE.

Application filed July 6, 1925. Serial No. 41,713.

*To all whom it may concern:*

Be it known that we, FRANCIS SMYTHE and ROSS SMYTHE, citizens of the United States, and residents of Akron, in the county of Plymouth and State of Iowa, have invented certain new and useful Improvements in an Egg-Handling Machine, of which the following is a specification.

Our invention relates to a device for handling eggs for transferring them from one container to another.

An object of our invention is to provide such a device which will accommodate the usual set of three dozen eggs which form one layer in the ordinary egg crate.

More particularly, it is our object to provide a device which has a number of pairs of egg-receiving loops depending from a suitable base, each pair being adapted to be received in a compartment of the cellular spacer ordinarily used in separating the eggs from one another, and to yieldingly encompass an egg so that the entire row of eggs may be lifted from the spacer, or lifted with the spacer from one crate to another.

A further purpose is to provide such an egg-handling device having a novel arrangement of handles and stripping bars for removing the eggs from the device, the stripping bars being so arranged that they may be supported by two parallel finger-engaging bars, so positioned relative to the handles that the operation of the device is rendered simple and speedy.

With these and other objects in view, our invention consists in the construction, arrangement and combination of the various parts of our device, whereby the objects contemplated are attained, as hereinafter more fully set forth, pointed out in our claims and illustrated in the accompanying drawings, in which:

Fig. 1 is a side elevation of the device illustrated in connection with a layer of eggs encompassed by a cellular spacer, portions of the spacer being broken away to better illustrate the construction and operation of the device.

Fig. 2 is an inverted plan view of the device, and

Fig. 3 is a perspective view illustrating the manner of holding the same.

We have used the reference character 10 to indicate generally a base formed of a square block of wood, or the like. Secured to the base are a plurality of rows, A, of pairs of wire loops, 11, the loops on one side of the respective pairs being aligned in in a single plane, and the loops on the other side of the respective pairs being aligned in another plane, spaced from said first plane. The loops of the respective pairs of the respective rows are also aligned in rows, B, extending transversley to the rows, A.

The loops are of such width that when inserted in the respective compartments of a cellular spacer, 12, they will yieldingly engage the sides of the compartments so that the spacer may be lifted together with the eggs, and are so spaced that the two loops of each pair will receive between them an egg, as shown in Fig. 1.

In Fig. 1, a leaf has been shown at 13, which is used to separate the spacers, 12.

The device is ordinarily used in transferring eggs from the farmer's crate to the crate which is used in shipping the eggs at the produce markets. The object primarily aimed at is to attain speed in so handling the eggs. The loops, 11, are of spring wire, and as the loops are forced downwardly into the compartments of the spacer, 12, they spring apart to receive the eggs. When the device is lifted the eggs will be supported by the loops, and in order to remove the eggs it is necessary to exert sufficient pressure against the ends of the eggs to again spread the loops.

For this purpose it is necessary, in order to accomplish the desired rapidity of handling, that all of the eggs be discharged simultaneously. There are thirty-six pairs of the loops in the ordinary form of the device, arranged in six rows of six pairs each.

Between the loops of each row, A, we provide a stripping bar for discharging the eggs, which is formed of an elongated loop of wire, 14, connected by metal cross pieces, 15, which are curled about the wire and soldered or welded thereto at their ends.

Above the base, 10, we provide a pair of finger-engaging bars, 16, to which are secured rods, 17, extending through the base, 10, and secured at their lower ends to cross pieces, 15. The bars, 16, extend transversely to the stripping bars, and each of the bars, 16, is connected to each of the stripping bars so that each stripping bar is supported at two points from the finger-engaging bars, 16. The rods, 17, are slidably mounted in openings extending through the base 10, which serves as a bearing for each of the rods and retains them in their proper perpendicular relation to the base and parallel to each other.

It will be noted that there are five of the cross pieces, 15, forming in each stripping bar six spaces which serve to receive the eggs. Thus the points of the eggs will be received between the side wires of the respective stripping bars, and any tendency of the eggs to slip laterally when pressure is applied to them will be restrained.

A pair of handles, 18, are secured to the base, 10, in positions parallel to the finger-engaging bar, 16, and spaced remotely therefrom. The fingers of the operator may thus be slipped under the handles and under the finger-engaging bar while the thumbs are allowed to extend over the handles and on top of the bars, 16. When the device is about to be filled with eggs, the fingers are used to exert pressure against the under side of the bar, 16, to raise the stripping bars. When the eggs are to be discharged, the bars, 16, are pressed downwardly at their central point by the thumbs. The position of the hands thus need not be changed during the operations of the loading and discharging, and the desired speed is thus attained.

At the same time the construction is very simple and inexpensive, the peculiar connection of the bars, 16, with the stripping bars, wherein they are arranged transversely to each other, serving to give rigidity to the entire stripping mechanism and to allow the moving of all of the bars simultaneously in as simple a manner as possible.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

1. In an egg-handling device, a base, a plurality of pairs of egg-receiving loops secured to and depending from, said base, said pairs of loops being aligned in rows, a plurality of stripping bars positioned between the loops of the respective rows, a pair of finger bars disposed above the base in positions extending transversely of the stripping bars, and spaced from each other and from the edges of the base, rods connecting each of the finger bars with each of the stripping bars, said rods being slidably extended through the base, and handles secured to the base, parallel to, and spaced from, the remote sides of the finger bars, whereby an operator may reach his fingers under, and his thumbs above, said handles to engage between said thumbs and fingers, the finger bars.

2. In an egg-handling device, a base, a plurality of pairs of egg-receiving loops secured to and depending from, said base, said pairs of loops being aligned in rows, a plurality of stripping bars positioned between the loops of the respective rows, a pair of finger bars disposed above the base in positions extending transversely of the stripping bars, and spaced from each other and from the edges of the base, rods connecting each of the finger bars with each of the stripping bars, said rods being slidably extended through the base, and handles secured to the base adjacent said finger bars.

3. In an egg-handling device, a base, a plurality of pairs of egg-receiving loops secured to and depending from, said base, said pairs of loops being aligned in rows, a plurality of stripping bars positioned between the loops of the respective rows, each of said stripping bars comprising an elongated loop of wire having cross pieces secured between its sides and spaced from each other, a pair of finger bars disposed above the base in positions extending transversely of the stripping bars, and spaced from each other and from the edges of the base, rods connecting each of the finger bars with each of the stripping bars, said rods being slidably extended through the base and attached to said cross pieces, and handles secured to the base adjacent said finger bars.

FRANCIS SMYTHE.
ROSS SMYTHE.